United States Patent [19]

Swiatek

[11] Patent Number: 5,029,681

[45] Date of Patent: Jul. 9, 1991

[54] SOLENOID PARKING BRAKE RELEASE

[75] Inventor: Thomas R. Swiatek, Rochester, Mich.

[73] Assignee: Dura Mechanical Components, Inc., Troy, Mich.

[21] Appl. No.: 445,244

[22] Filed: Dec. 4, 1989

[51] Int. Cl.5 ............................................. F16D 65/28
[52] U.S. Cl. .................... 192/4 A; 192/4 C; 74/531
[58] Field of Search ............... 192/4 A, 4 C; 74/531

[56] References Cited

U.S. PATENT DOCUMENTS

| 3,236,120 | 2/1966 | Fender | 74/531 |
|---|---|---|---|
| 3,236,121 | 2/1966 | Gdowik et al. | 74/531 |
| 3,315,538 | 4/1967 | Fender | 74/531 |
| 3,509,505 | 4/1970 | Zagrzjewski | 335/274 |
| 3,509,506 | 4/1970 | Bird | 335/274 |
| 3,800,774 | 1/1989 | Hogiwara et al. | 74/531 |
| 3,822,469 | 7/1974 | Lazenby | 335/274 |
| 3,952,774 | 4/1976 | Loveless | 335/274 |
| 4,421,214 | 12/1983 | Sellmeyer | 192/4 A |
| 4,450,423 | 5/1984 | Morishita | 335/274 |
| 4,462,487 | 7/1984 | Warwick et al. | 192/4 A |
| 4,553,650 | 11/1985 | Warwick et al. | 192/4 A |
| 2,821,275 | 1/1958 | Martin | 192/4 A |

Primary Examiner—Allan D. Herrmann
Assistant Examiner—Nicholas Whitelaw

[57] ABSTRACT

A solenoid parking brake release assembly (10) for setting a parking brake (12) and automatically releasing the parking brake (12) includes a lever (26) connected to the foot pedal (28) for rotating a rack portion (30) upon depression thereof. The rack portion (30) coacts to rotate a gear (46) about which is a torsion spring (54) which frictionally grips the gear (46) to maintain same in a rotated position. The torsion spring (54) includes a first end connected to the core element (66) of a solenoid (64) such that upon energization of the solenoid (64), the core element (66) is drawn into the solenoid (64) which releases the frictionaly grip on the gear (46) allowing the parking brake (12) to be released. The solenoid (64) is energized by the gear voltage from the gear selector (14) of a vehicle transmission when the ignition is on, the parking brake (12) is depressed, and one of the forward or reverse gears are selected.

4 Claims, 5 Drawing Sheets

SOLENOID PARKING BRAKE RELEASE

TECHNICAL FIELD

The invention relates to a control assembly for actuating and automatically releasing the parking brake of a vehicle.

BACKGROUND OF THE INVENTION

Several types of manually operated and foot operated devices have been developed for actuating parking brakes of automotive vehicles. Manually operated or foot operated devices have included the use of brake actuating levers in conjunction with a torsion spring for holding the lever in the brake setting position wherein the torsion spring is releasable to release the parking brake.

One such device is disclosed in U.S. Pat. No. 3,236,120 issued Feb. 22, 1966 in the name of Fender and assigned to Universal American Corporation. The patent discloses a method and assembly for controlling a parking brake mechanism of an automotive vehicle wherein the brake mechanism is held in the brake setting position by frictional engagement between a torsion spring and a drum which fits over the gear or pinion of the brake setting mechanism. The brake setting mechanism may be reliably held in brake setting position by the torsion spring and released with minimum of effort by the vehicle operator. The torsion spring is normally stressed to frictionally engage and grip the gear to hold the brakes in set position and includes a distal end which is actuated to flex the spring with a minimum of effort to release the spring from frictional engagement with the member and thereby release the parking brake mechanism. A vacuum mechanism is connected to the distal end to provide power release of the torsion spring. Power release is accomplished by engine vacuum wherein a valve is connected to the vehicle transmission whereby its movement actuates the valve. U.S. Pat. No. 3,236,121 issued Feb. 22, 1966 in the name of Gdowik and U.S. Pat. No. 3,315,538 issued Apr. 25, 1967 in the name of Fender, both assigned to Universal American Corporation, disclose similar brake assemblies utilizing a vacuum.

The problem with the use of a vacuum mechanism is that such is sensitive to changes in atmospheric pressure, and also tend to have a short life due to wear. Furthermore, it is difficult to utilize a source of vacuum with smaller engines.

SUMMARY OF THE INVENTION AND ADVANTAGES

The invention is a brake control assembly and a method for setting a parking brake and releasing the parking brake in a vehicle having a transmission which produces a gear voltage when set to one of reverse or forward gears. The assembly comprises actuating means for moving between a brake set position to set the parking brake and a brake release position to release the parking brake. The assembly is characterized by including releasing means operatively connected to the actuating means for receiving a "gear" voltage produced when the vehicle transmission is set to one of reverse or forward gears and automatically releasing the parking brake by moving the actuating means to the brake release position in response to the gear voltage.

The invention also includes the releasing means comprising a solenoid operatively connected to the actuating means for receiving a gear voltage and automatically releasing the parking brake by moving the actuating means to the brake release position in response to the gear voltage.

The advantages of such an assembly are that a solenoid may be easily used with all engine sizes. The solenoid utilizes existing electrical signals and is not sensitive to temperature or pressure variation. Furthermore, the solenoid is compact and more durable than a diaphragm used in vacuum mechanisms.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
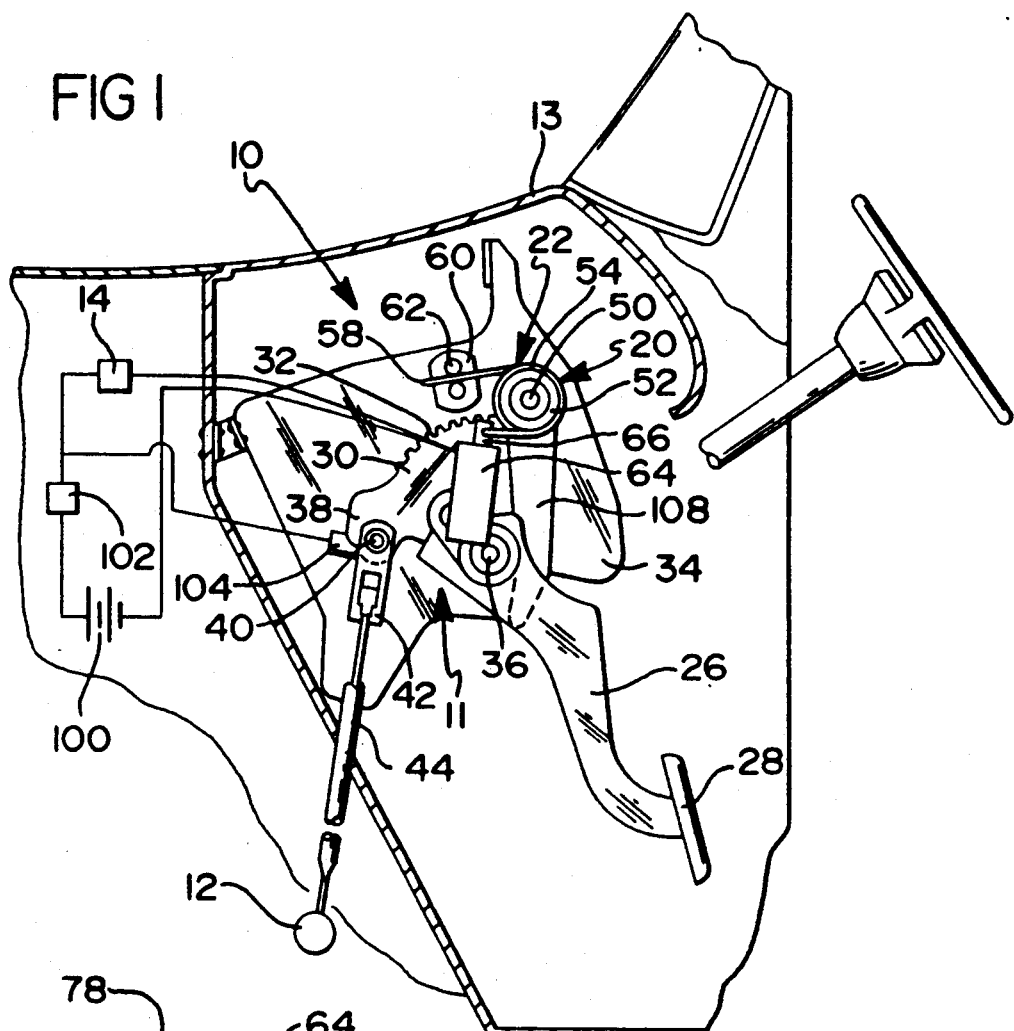
FIG. 1 is a schematic diagram of the subject invention in a vehicle.

A brake control assembly for setting the parking brake and automatically releasing the parking brake is generally shown at 10 in FIG. 1. The brake control assembly 10 releases the parking brake 12 upon receiving a "gear" voltage produced when a gear selector 14 of the transmission of a vehicle 13 is set to one of reverse or forward gears.

Figure 2:
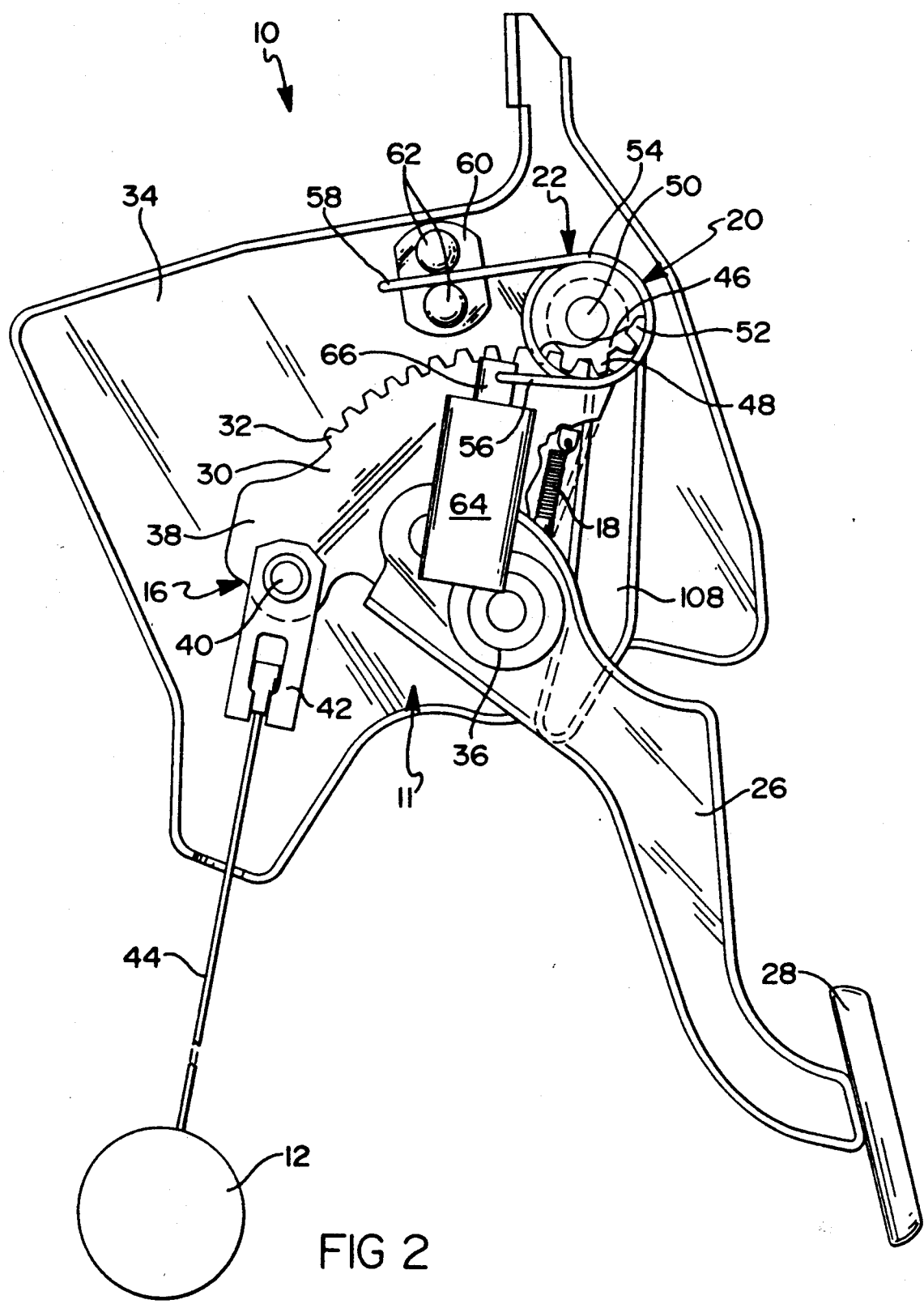
FIG. 2 is an enlarged partially cut away side view of the subject invention.

The brake control assembly 10 is more specifically illustrated in FIG. 2. The brake control assembly 10 includes actuating means 11 for moving between a brake set position to set the parking brake 12 and a brake release position to release the parking brake 12. The brake control assembly 10 includes releasing means 64 operatively connected to the actuating means 11 for receiving the gear voltage produced when the gear selector 14 of the vehicle transmission is set to one of reverse or forward gears and automatically releasing the parking brake 12 by moving the actuating means 11 to the brake release position in response to the gear voltage.

The actuating means 11 includes link means 16 for moving between an actuated position and a deactuated position. FIG. 2 illustrates the link means 16 in the deactuated position. The link means 16 includes a lever 26 mounting a foot pedal 28 which is manually actuatable to operate the parking brake 12. The lever 26 is connected to a rack 30 having teeth 32. The lever 26 and rack 30 are connected to a housing plate 34 by a rivet 36 which serves as a pivot for lever 26. When the foot pedal 28 is depressed, the lever 26 and rack 30 rotate about the rivet 36 in a clockwise direction from their normally deactuated position to the actuated position. The lever 26 also includes an arm 38 connected by a pin 40 to a clevis 42 of a brake cable 44, which is in turn connected to the parking brake 12. The clockwise rotation of the lever 26 to the actuated position pulls the brake cable 44 to an extended position which sets the parking brake 12. The actuating means 11 also includes a spring 18 connected to the lever 26 for biasing the same toward the deactuated position.

The actuating means 11 further includes pinion means 20 coacting with the rack teeth 32 for rotating between a rotated position when the lever 26 is moved to the actuated position, and an unrotated position when the lever 26 is moved to the deactuated position. The pinion means 20 comprises a gear or pinion 46 having gear teeth 48. The gear teeth 48 of the gear 46 coact with the rack teeth 32 of the rack 30 to rotate the gear 46 in response to movement of the lever 26. When the lever 26 is moved to the actuated position, the gear 46 is rotated counterclockwise to the rotated position. A journal pin 50 rotatably mounts the gear 46 to the housing plate 34. The pinion means 20 also includes a drum member 52 which fits over a tenon portion of the gear 46 and is welded to the gear 46, as is commonly known in the art.

The actuating means 11 also includes locking means 22 operatively connected to the gear 46, 20 and moveable between a locked position maintaining the gear 46 in the rotated position and an unlocked position releasing the gear 46. The locking means 22 includes a torsion spring 54 having a series of coiled convolutions 55. The interior diameter of the torsion spring 54 is of a dimension to snugly fit onto the exterior cylindrical surface of the drum member 52 and normally frictionally grip the same. The torsion spring 54 includes first 56 and second 58 terminal ends extending from the torsion spring coils 55. The locking means 22 includes an anchor member 60 connected to the housing plate 34 by means of rivets 62 in order to secure the end 58 to the housing plate 34. In operation, as the gear 46 is rotated by the rack portion 30 moving to the actuated position, the torsion spring 54 frictionally grips the drum member 52 so that when the lever 26 is released, the torsion spring 54 will maintain the drum member 52 and therefore the lever 26 and parking brake 12 in the actuated and brake set position.

Only slight relative movement of the end 56 of the torsion spring 54 is necessary to substantially eliminate or render ineffective the frictional grip of the torsion spring 54 on the drum member 52 so that the lever 26 returns to its deactuated position as biased by spring 18, thereby releasing the parking brake 12. A handle 108 is connected to the torsion spring 54 for manually releasing the lever 26, as is commonly known in the art. The link means 16, biasing means 18, pinion means 20, and locking means 22 are commonly known in the art and have been generally described herein.

The releasing means 64 comprises a solenoid for receiving the gear voltage and moving the end 56 to expand the torsion spring 54. The solenoid 64 includes a core element 66 connected to the end 56 which is moveable between a release position to move the end 56 to the unlocked position upon receiving the gear voltage, and a neutral position to maintain the end 56 in the locked position in the absence of the gear voltage.

Figure 3C:
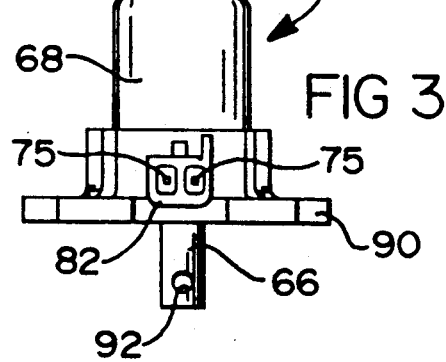
FIG. 3C is a side view, viewed in the direction indicated as 3C of FIG. 3A.
Figure 3B:
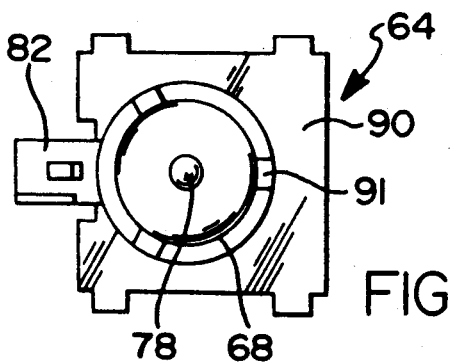
FIG. 3B is a top view, viewed in the direction indicated as 3B of FIG. 3A.
Figure 3A:
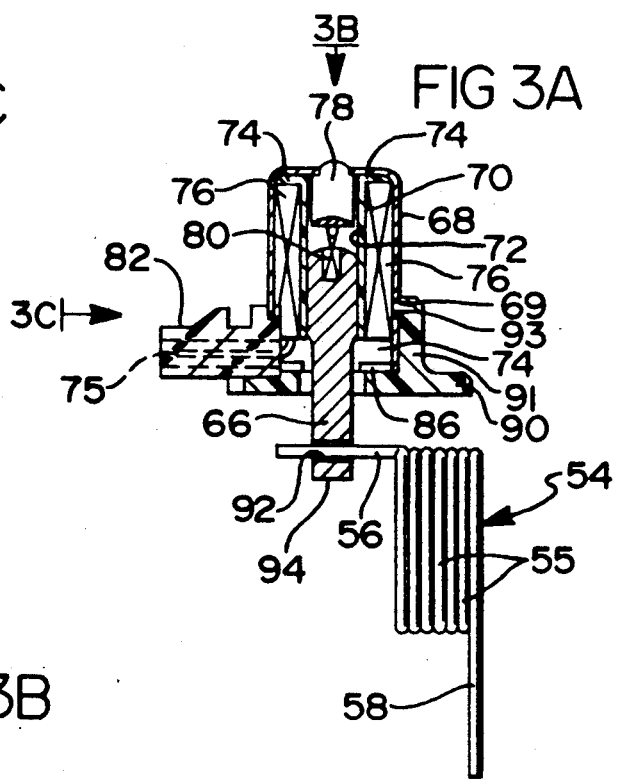
FIG. 3A is a cross sectional view of the solenoid with the torsion spring.

The solenoid 64 is more specifically indicated in FIGS. 3A-3C. The solenoid 64 includes a support cover 68. A bobbin 70 is supported within the support cover 68. The bobbin 70 is generally cylindrical in shape and has an aperture 72 therethrough. The ends of the cylindrical bobbin 70 have radially extending flanges 74. A magnet wire 76 is wound between the support cover 68 and bobbin 70 and within the flanges 74. When the magnet wire 76 receives a gear voltage signal, energization produces a magnetic field which draws the core element 66 into the bobbin 70. A pole piece 78 extends from the support cover 68 into the aperture 72 of the bobbin 70 to produce a temporary magnet in response to energization of the magnet wire 76.

The core element 66 is generally cylindrical in shape and is slidably retained within the aperture 72. An extension spring 80 is connected between the pole piece 78 and the core element 66 for biasing the core element 66 to the neutral position extending beyond the support cover 68. Energization of the magnet wire 76 will overcome the extension spring 80 to draw the core element 66 into the bobbin 70. The solenoid 64 includes a connector 82 through which extend the two terminals 75 of the magnet Wires 76 and which is adapted to be connected to the gear selector 14.

A flux washer 86 includes an aperture 88 allowing the core element 66 to slide therethrough. The flux washer 86 is connected between the bobbin 70 and a mounting base 90. The mounting base 90 supports the support cover 68 and the connector 82, and includes flexible locking arms 91 for snapping the mounting base 90 to the support cover 68. The support cover 68. The support cover 68 includes notches 69 therein for receiving a shoulder 93 of the locking arms 91.

The core element 66 includes an aperture 92 within a first end 94 for receiving the end 56 of the torsion spring 54 to move the end 56 therewith. When the magnet wire 76 is energized, the core element 66 is moved to its release position which causes the torsion spring 54 to move to its unlocked position, which in turn releases the drum member 52. When the magnet wire 76 is deenergized, the extension spring 80 pushes the core element 66 to the neutral position extending from the bobbin 70 which allows the torsion spring 54 to lock the drum member 52 upon rotation of the gear 46.

The core element 66 is generally made of steel, as are the pole piece 78, flux washer 86 and support cover 68. The mounting base 90, connector 82 and bobbin 70 are made of a nylon material. The extension spring 80 is made of spring wire. The magnet wire 76 is made of copper.

As is commonly known in the art, the gear selector 14 is moveable between park P, reverse R, neural N, drive D, D2, and D1 positions. When the gear selector 14 is moved to one of the R, D, D2, or D1 positions, a gear selector switch 96 closes to supply a 2-volts signal along a conductor 98. The 12-volt signal is connected to the terminals 75 of the magnet wire 76 by the conductor 98. The 12-volt signal is supplied by the battery 100 of the vehicle and is connected to the gear selector switch 96 by the ignition switch 102. When the ignition switch 102 is open, the voltage signal is not supplied to the gear selector switch 96 and does not cause a voltage to be supplied to the terminals 75. When the ignition switch 102 is closed, the voltage signal may be supplied to the gear selector switch 96.

The foot pedal 28 and lever 26 operate an electrical pedal switch 104 which is connected between the ignition switch 102 and the gear selector 14. The pedal switch 104 is closed when the lever 26 is moved to the deactuated position preventing heating of the solenoid 64 by the continuous supply of voltage, and is opened when the lever 26 is in the actuated position. The pedal switch 102 may be a contact switch which senses movement of the lever 26 from the deactuated position.

Figure 4:
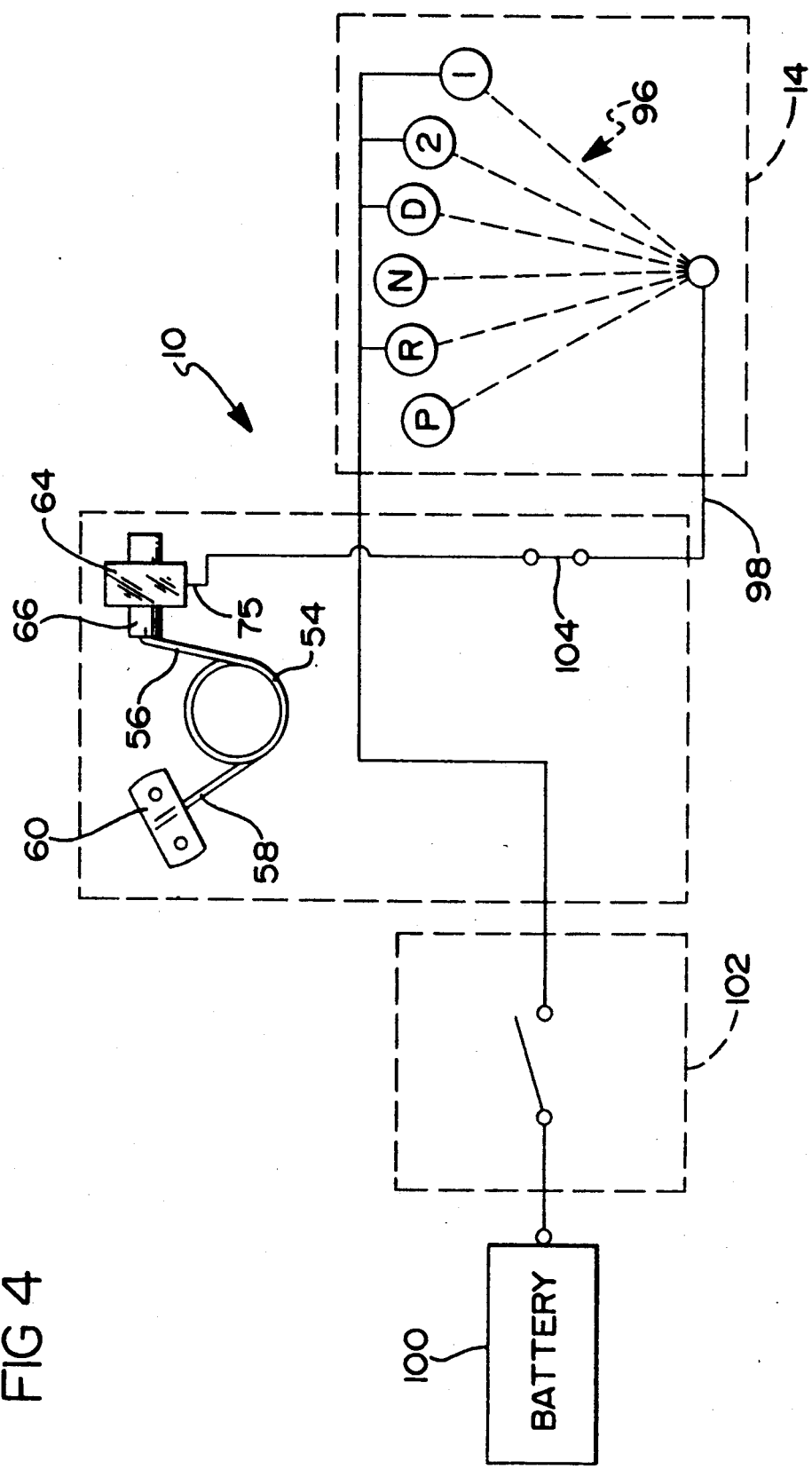
FIG. 4 is a schematic diagram illustrating the operation of the subject invention with the ignition off and the pedal depressed.

The operation of the assembly 10 will be generally described with reference to FIGS. 4-6. FIG. 4 illustrates the condition when the ignition switch 102 is open and therefore supplies no voltage signal to the gear selector 14. The pedal switch 104 is close with the lever 26 in the actuated position. If the gear selector 14 is moved to any of the P, R, N, D, D2, or D1 positions indicated by dotted lines, the parking brake 12 will remain in the brake set position, since the voltage signal is not supplied to the solenoid 64 due to the open ignition switch 102.

Figure 5:
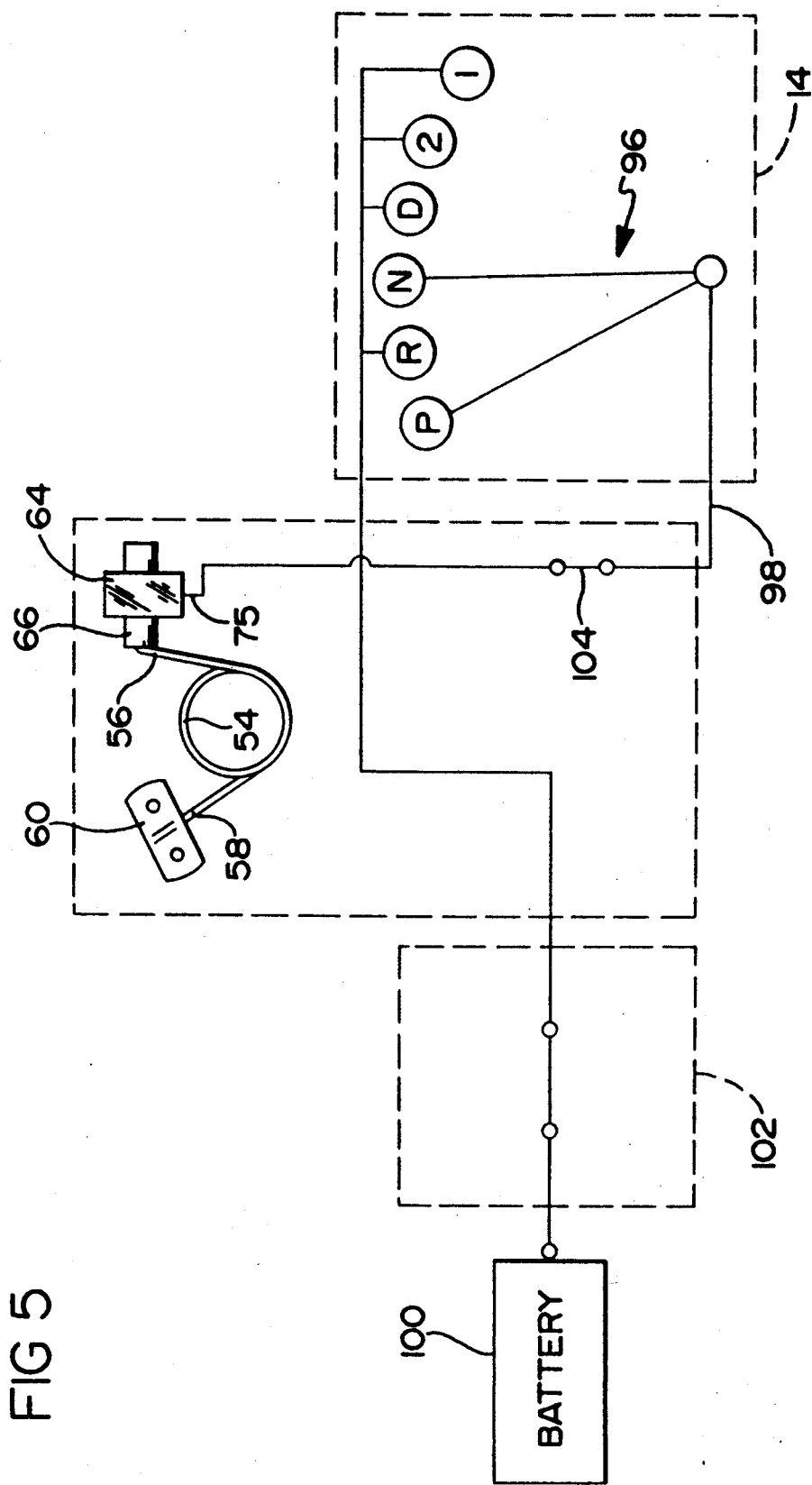
FIG. 5 is a schematic diagram illustrating the subject invention with the ignition on and the pedal depressed.
Figure 6:
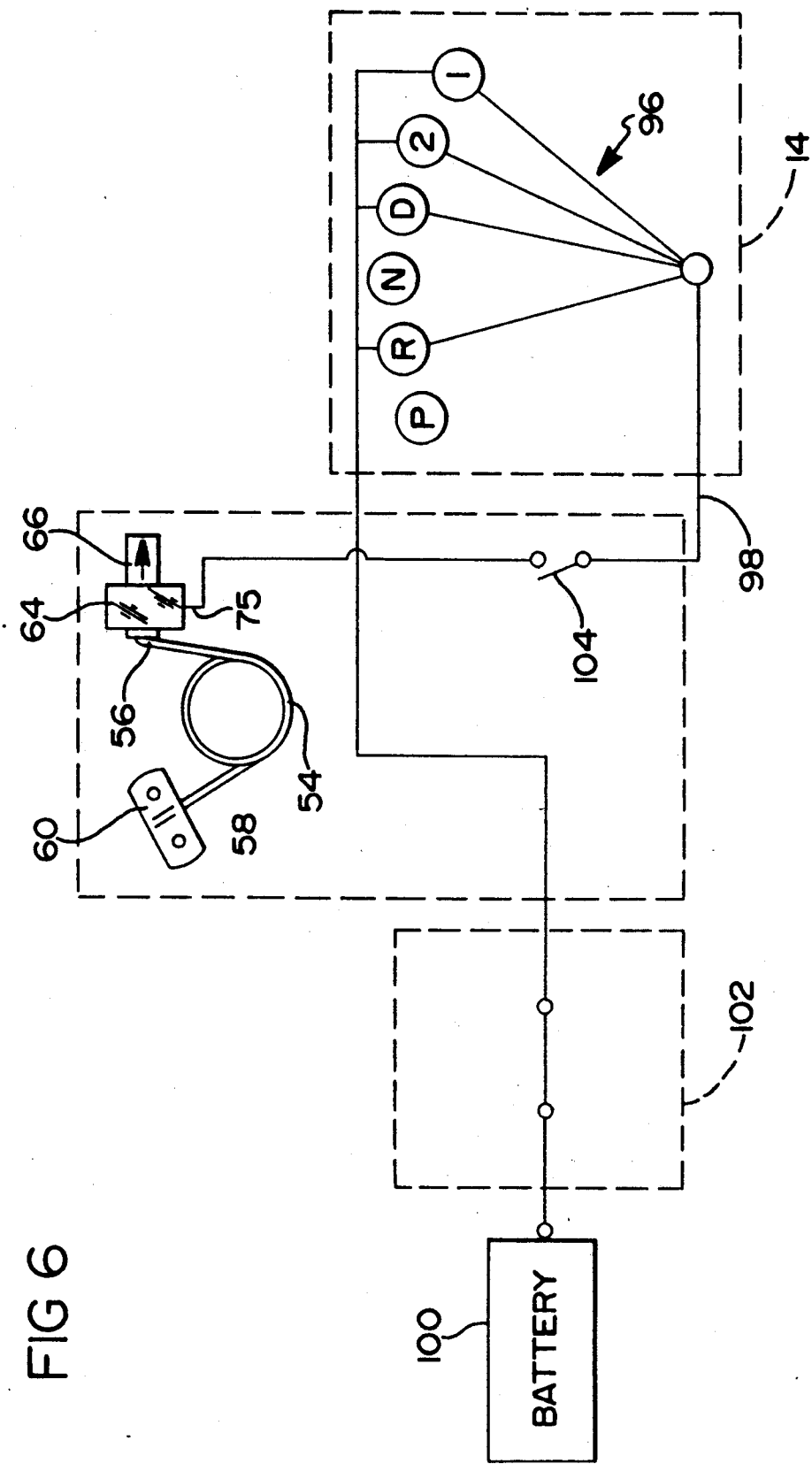
FIG. 6 is a schematic diagram illustrating the subject invention with the ignition on without the pedal depressed and with the solenoid core element in the release position.

As illustrated in FIG. 5, when the ignition switch 102 is closed and the pedal switch 104 is closed with the parking brake 12 depressed, the parking brake 12 will remain locked by the actuating means 11 being in the brake set position when the gear selector 14 is in either one of the P or N positions.

Additionally, if the foot pedal 28 is continually depressed, movement of the gear selector 14 to any of the positions will not change the parking brake 12 position. As illustrated in FIG. 6, when the ignition switch 102 is closed and the pedal switch 104 is closed, but there is no continuous depression of the pedal 28, movement of the gear selector 14 to one of the R, D, D2, or D1 positions energizes the solenoid 64. This moves the core element 66 into the bobbin 70, which pulls the first terminal end 56 releasing the gear 46. Therefore, the parking brake 12 will be automatically released.

This invention includes the method of setting a parking brake 12 and automatically releasing the parking brake 12, the method including the steps of setting the parking brake 12 in the brake set position, receiving a gear voltage indicative of the vehicle transmission being set to one of reverse or forward gears, and automatically releasing the parking brake 12 in response to the gear voltage allowing the parking brake 12 to move to a brake release position. Also included are the steps of receiving the gear voltage and producing a magnetic field to effectuate release of the parking brake 12, moving a core element 66 in response to the magnetic field to release the parking brake 12, and biasing the core element 66 to prevent release of the parking brake 12 in the absence of the gear voltage.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A brake control assembly for a vehicle parking brake, comprising a brake actuator (11) movable between brake set and brake released positions setting and releasing the parking brake (12); releasable locking means (22) for locking the actuator (11) in brake set position including a one-way clutch (20) permitting setting but preventing release of the parking brake; an electrically-operated releasing device (64) for releasing the clutch (20) to enable movement of the brake actuator (11) to brake released position when activated; a power circuit including an ignition switch (102), said releasing device (64), and a gear selector switch (96); and a transmission gear selector (14) which closes the gear selector switch (96) when set to one of reverse or forward gears to generate a gear voltage which activates the releasing device (64) to release the clutch (20) and enable movement of the brake actuator (11) to release position only when the ignition switch (102) is closed.

2. An assembly as set forth in claim 1, wherein the releasing device (64) comprises a solenoid (64, 66) for receiving the gear voltage to release the clutch (20).

3. An assembly as set forth in claim 2, including a spring (18) biasing the brake actuator (11) to brake release position.

4. An assembly as set forth in claim 3, characterized by the brake actuator (11) including gear teeth (32), and by the one-way clutch (20) including a rotatable spring (54) normally grasping a hub (52) on the pinion (46) to enable rotation of the pinion (46) by the teeth (32) and permit movement of the brake actuator (11) to brake apply position, but prevent rotation of the pinion (46) by the teeth (32) and prevent movement of the brake actuator (11) to brake release position, whereby the solenoid (64, 66) is operable upon activation to cause the torsion spring (54) to release its grasp on the pinion hub (52) and enable movement of the brake actuator (11) to brake release position.

* * * * *

UNITED STATES PATENT AND TRADEMARK OFFICE
CERTIFICATE OF CORRECTION

PATENT NO. : 5,029,681
DATED : July 9, 1991
INVENTOR(S) : Thomas R. Swiatek

It is certified that error appears in the above-identified patent and that said Letters Patent is hereby corrected as shown below:

In the COVER PAGE:

In line 12 of the ABSTRACT:

"frictionaly" should read -- frictional --

Claim 4:

Col. 2, line 40, between "rotatable" and "spring", please add -- pinion (46) engaging the gear teeth (32) and a torsion --

Signed and Sealed this

Second Day of June, 1992

Attest:

DOUGLAS B. COMER

Attesting Officer

Acting Commissioner of Patents and Trademarks